(12) United States Patent
Li et al.

(10) Patent No.: US 10,606,846 B2
(45) Date of Patent: Mar. 31, 2020

(54) SYSTEMS AND METHODS FOR HUMAN INSPIRED SIMPLE QUESTION ANSWERING (HISQA)

(71) Applicant: Baidu USA, LLC, Sunnyvale, CA (US)

(72) Inventors: Lei Li, Mountain View, CA (US); Zihang Dai, Pittsburgh, PA (US); Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 782 days.

(21) Appl. No.: 15/162,503

(22) Filed: May 23, 2016

(65) Prior Publication Data

US 2017/0109355 A1    Apr. 20, 2017

Related U.S. Application Data

(60) Provisional application No. 62/242,788, filed on Oct. 16, 2015.

(51) Int. Cl.
*G06F 16/2457* (2019.01)
*G06F 16/2455* (2019.01)
(Continued)

(52) U.S. Cl.
CPC .... *G06F 16/24578* (2019.01); *G06F 16/2455* (2019.01); *G06F 16/345* (2019.01);
(Continued)

(58) Field of Classification Search
CPC .. G06F 17/30477; G06F 3/0445; G06F 3/022; G06F 7/005
See application file for complete search history.

(56) References Cited

U.S. PATENT DOCUMENTS

2012/0101965 A1   4/2012   Hennig
2014/0163962 A1   6/2014   Castelli et al.
(Continued)

OTHER PUBLICATIONS

Yang et al., "Joint Relational Embeddings for Knowledge-based Question Answering", Proceedings of the 2014 Conference on Empirical Methods in Natural Language Processing (EMNLP), Oct. 25, 2014 (Oct. 25, 2014), pp. 645-650 (Year: 2014).*
(Continued)

*Primary Examiner* — Robert A Cassity
*Assistant Examiner* — Robert Lewis Kulp
(74) *Attorney, Agent, or Firm* — North Weber & Baugh LLP

(57) ABSTRACT

Described herein are systems and methods for determining how to automatically answer questions like "Where did Harry Potter go to school?" Carefully built knowledge graphs provide rich sources of facts. However, it still remains a challenge to answer factual questions in natural language due to the tremendous variety of ways a question can be raised. Presented herein are embodiments of systems and methods for human inspired simple question answering (HISQA), a deep-neural-network-based methodology for automatic question answering using a knowledge graph. Inspired by human's natural actions in this task, embodiments first find the correct entity via entity linking, and then seek a proper relation to answer the question—both achieved by deep gated recurrent networks and neural embedding mechanism.

20 Claims, 10 Drawing Sheets

(51) Int. Cl.
G06N 3/04 (2006.01)
G06N 5/02 (2006.01)
G06F 16/901 (2019.01)
G06F 16/34 (2019.01)
G06N 7/00 (2006.01)

(52) U.S. Cl.
CPC ....... G06F 16/9024 (2019.01); G06N 3/0445 (2013.01); G06N 5/022 (2013.01); G06N 7/005 (2013.01)

(56) References Cited

U.S. PATENT DOCUMENTS

2016/0350653 A1* 12/2016 Socher .................. G06N 3/0445
2016/0358094 A1* 12/2016 Fan ...................... G06F 17/3053

OTHER PUBLICATIONS

Blatz et al., "Confidence estimation for machine translation", Final report, JHU/CLSP Summer Workshop, 2003, pp. 1-113 (Year: 2004).*
Yih et al. ("Semantic Parsing via Staged Query Graph Generation: Question Answering with Knowledge Base", Proceedings of the 53rd Annual Meeting of the Association for Computational Linguistics and the 7th International Joint Conference on Natural Language Processing, Jul. 26-31, 2015 (Year: 2015).*
Huang et al ("Bidirectional LSTM-CRF Models for Sequence Tagging", arXiv:1508.01991v1 [cs.CL], https://arxiv.org/abs/1508.01991, Aug. 9, 2015) (Year: 2015).*
Lefferty et al ("Conditional Random Fields: Probabilistic Models for Segmenting and Labeling Sequence Data", Proceedings of the 18th International Conference on Machine Learning 2001, pp. 1-10) (Year: 2001).*
Bordes et al ("Question Answering with Subgraph Ennbeddings", Proceedings of the 2014 Conference on Empirical Methods in Natural Language Processing (EMNLP), Oct. 25-29, 2014, pp. 615-620) (Year: 2014).*
Yao et al ("Information Extraction over Structured Data: Question Answering with Freebase", Proceedings of the 52nd Annual Meeting of the Association of Computational Linguistics, vol. 1, Jun. 2014, pp. 1-11) (Year: 2014).*
Yih et al. ("Semantic Parsing via Staged Query Graph Generation: Question Answering with Knowledge Base", Proceedings of the 53rd Annual Meeting of the Association for Computational Linguistics and the 7th International Joint Conference on Natural Language Processing, Jul. 26-31,2015 (Year: 2015) (Year: 2015).*
Dong et al ("Question Answering over Freebase with Multi-Column Convolutional Neural Networks", Proceedings of the 53rd Annual Meeting of the Association for Computational Linguistics and the 7th International Joint Conference on Natural Language Processing, Jul. 26-31, 2015, pp. 260-269) (Year: 2015).*
Bordes et al., "Open question answering with weakly supervised embedding models," In Machine Learning and Knowledge Discovery in Databases, pp. 165-180. Springer, 2014.
Cai et al., "Large-scale semantic parsing via schema matching and lexicon extension," In ACL (1), pp. 423-433. Citeseer, 2013.
Cho et al., "Learning phrase representations using RNN encoder-decoder for statistical machine translation," arXiv preprint arXiv:1406.1078, 2014 (15pgs).
Chung et al., "Empirical evaluation of gated recurrent neural networks on sequence modeling," arXiv preprint arXiv:1412.3555, 2014 (9pgs).
Collobert et al., "Natural language processing (almost) from scratch," The Journal of Machine Learning Research, 12:2493-2537, 2011 (47pgs).
Duchi et al., "Adaptive subgradient methods for online learning and stochastic optimization," The Journal of Machine Learning Research, 12:2121-2159, 2011 (39pgs).

Fader et al., "Paraphrase-driven learning for open question answering," In ACL (1), pp. 1608-1618. Citeseer, 2013 (11pgs).
Graves et al., Speech recognition with deep recurrent neural networks, In Acoustics,Speech and Signal Processing (ICASSP), 2013 IEEE Int'l Conference on, pp. 6645-6649.
Greff et al., "LSTM: A search space odyssey," arXiv preprint arXiv:1503.04069, 2015 (18pgs).
Guu et al., "Traversing knowledge graphs in vector space," arXiv preprint arXiv:1506.01094, 2015 (10pgs).
Socher et al., "Recursive deep models for semantic compositionality over a sentiment treebank," In Proceedings of the conference on empirical methods in natural language processing (EMNLP), vol. 1631, p. 1642, Citeseer, 2013 (12pgs).
Srivastava, "Improving neural networks with dropout," MS thesis, University of Toronto, 2013 (26pgs).
Sutskever et al., "Sequence to sequence learning with neural networks," In Advances in Neural Information Processing Systems, pp. 3104-3112, 2014.
Tai et al., "Improved semantic representations from tree-structured long short-term memory networks," In Association for Computational Linguistics (ACL), 2015 (11pgs).
Tang et al., "Using multiple clause constructors in inductive logic programming for semantic parsing," In Machine Learning: ECML 2001, pp. 466-477, Springer, 2001 (12pgs).
Yih et al., "Semantic parsing via staged query graph generation: Question answering with knowledge base," In Proceedings of ACL, 2015 (12pgs).
Yang et al., "Embedding entities and relations for learning and inference in knowledge bases," arXiv preprint arXiv:1412.6575, 2014 (13pgs).
Yang et al., "Joint relational embeddings for knowledge-based question answering," In Proceedings of the 2014 Conference on Empirical Methods in Natural Language Processing (EMNLP), pp. 645-650, 2014 (6pgs).
Office Action dated Sep. 26, 2017, in Japanese Patent Application No. JP 2016/203696, and the machine translation (7 pgs).
Min-Chul Yang et al., "Joint Relational Embeddings for Knowledge-based Question Answering", Proceedings of the 2014 Conference on Empirical Methods in Natural Language Processing (EMNLP), Oct. 25, 2014 (8 Pgs).
Yao et al., "Information extraction over structured data: Question answering with freebase," In Proceedings of ACL, 2014 (11pgs).
Yih et al., "Semantic parsing for single-relation question answering," In Proceedings of ACL, 2014 (6pgs).
Zaremba et al., "Recurrent neural network regularization," arXiv preprint arXiv:1409.2329, 2014 (8pgs).
Zelle et al., "Learning to parse database queries using inductive logic programming," In Proceedings of the National Conference on Artificial Intelligence, pp. 1050-1055, 1996.
Pascanu et al., "How to construct deep recurrent neural networks," arXiv preprint arXiv:1312.6026, 2013 (13pgs).
Pham et al., "Dropout improves recurrent neural networks for handwriting recognition,"In Frontiers in Handwriting Recognition(ICFHR), 2014 14th Int'l Conference on, pp. 285-290.
Reddy et al., "Large-scale semantic parsing without question-answer pairs," Transactions of the Association for Computational Linguistics, 2:377-392, 2014 (16pgs).
Rumelhart et al., "Learning representations by back-propagating errors," Cognitive modeling, 5:3, 1988 (4pgs).
Schuster, "On supervised learning from sequential data with applications for speech recognition," PhD thesis, Nara Institute of Science and Technology, 1999 (46pgs).
Schuster et al., "Bidirectional recurrent neural networks," Signal Processing, IEEE Transactions on, 45(11):2673-2681, 1997 (9pgs).
Socher et al., "Semantic compositionality through recursive matrix-vector spaces," In Proceedings of the 2012 Joint Conference on Empirical Methods in Natural Language Processing and Computational Natural Language Learning, pp. 1201-1211. Association for Computational Linguistics, 2012 (11pgs).
Socher et al., "Learning continuous phrase representations and syntactic parsing with recursive neural networks," In Proceedings of the NIPs-2010 Deep Learning and Unsupervised Feature Learning Workshop, pp. 1-9, 2010 (9pgs).

(56) References Cited

OTHER PUBLICATIONS

Baldi et al., "Exploiting the past and the future in protein secondary structure prediction," Bioinformatics, 15(11):937-946, 1999 (10pgs).
Bengio et al., "A neural probabilistic language model," The Journal of Machine Learning Research, 3:1137-1155, 2003 (19pgs).
Berant et al., "Semantic parsing on freebase from question-answer pairs," In EMNLP, pp. 1533-1544, 2013 (12pgs).
Berant et al., "Semantic parsing via paraphrasing," In Proceedings of ACL, vol. 7, p. 92, 2014 (11pgs).
Bollacker et al., "Freebase: A collaboratively created graph database for structuring human knowledge," In Proceedings of the 2008 ACM SIGMOD international conference on Management of data, pp. 1247-1250. ACM, 2008 (3pgs).
Bordes et al., "Question answering with subgraph embeddings," arXiv preprint arXiv:1406.3676, 2014 (6pgs).
Bordes et al., "Large-scale simple question answering with memory networks," arXiv preprint arXiv:1506.02075, 2015 (10pgs).
Bordes et al., "Translating embeddings for modeling mult-irelational data," In Advances in Neural Information Processing Systems, pp. 2787-2795, 2013 (9pgs).
Bordes et al., "Learning structured embeddings of knowledge bases," In Conference on Artificial Intelligence, No. EPFL-CONF-192344, 2011 (6pgs).
Hochreiter et al., "Long short-term memory," Neural computation, 9 (8):1735-1780, 1997 (32pgs).
Huang et al., "Bidirectional LSTM-CRF models for sequence tagging," arXiv preprint arXiv:1508.01991, 2015 (10pgs).
Jozefowicz et al., "An empirical exploration of recurrent network architectures," In Proceedings of the 32nd Int'l Conference on Machine Learning (ICML-15), pp. 2342-2350, 2015.
Kalchbrenner et al., "A convolutional neural network for modelling sentences," arXiv preprint arXiv:1404.2188, 2014 (11pgs).
Kim et al., "Convolutional neural networks for sentence classification," In Proceedings of the 2014 Conference on Empirical Methods in Natural Language Processing (EMNLP), pp. 1746-1751, Doha, Qatar, Oct. 2014. Association for Computational Linguistics (6pgs).
Krizhevsky et al., "ImageNet classification with deep convolutional neural networks," In Advances in neural information processing systems, pp. 1097-1105, 2012.
Kwiatkowski et al., "Scaling semantic parsers with on-the-fly ontology matching," In EMNLP, 2013 (12pgs).
Liang et al., "Learning dependency-based compositional semantics," Computational Linguistics, 39(2):389-446, 2013 (10pgs).
Palangi et al., "Deep sentence embedding using the long short-term memory network: Analysis and application to information retrieval," CoRR, abs/1502.06922, 2015 (20pgs).
European Search Report dated May 15, 2017, in International Patent Application No. EP 16/19/3941, dated May 23, 2017 (12 pgs).
Min-Chul Yang et al., "Joint Relational Embeddings for Knowledge-based Question Answering", Proceedings of The 2014 Conference on Empirical Methods in Natural Language Processing (EMNLP), Oct. 25, 2014 (6 Pgs).
Antoine Bordes et al., "Open Question Answering with Weakly Supervised Embedding Models", Network and Parallel Computing; [Lecture Notes in Computer Science; Lect Notes Computer], Springer International Publishing, Sep. 15, 2014 (16 Pgs).

* cited by examiner ic, or characteristic described in connection with the embodiment is included in at least one embodiment of the invention and may be in more than one embodiment. Also, the appearances of the above-noted phrases in various places in the specification are not necessarily all referring to the same embodiment or embodiments.

SYSTEMS AND METHODS FOR HUMAN INSPIRED SIMPLE QUESTION ANSWERING (HISQA)

CROSS-REFERENCE TO RELATED APPLICATION

This application claims the priority benefit under 35 USC § 119(e) to commonly assigned and U.S. Provisional Patent Application No. 62/242,788, filed on Oct. 16, 2015, entitled "Systems And Methods For Human Inspired Simple Question Answering (HISQA)," listing Lei Li, Zihang Dai, and Wei Xu as inventors. The aforementioned patent document is incorporated by reference herein in its entirety.

TECHNICAL FIELD

The present disclosure relates generally to computing technologies, and more specifically to systems and methods for automating the answering of questions raised in natural language and improving human computer interfacing.

BACKGROUND

Issue exists about how to automatically answer questions, such as "Where did Harry Potter go to school?" Carefully built knowledge graphs provide rich sources of facts. However, it still remains a challenge to answer fact-based questions in natural language due to the tremendous variety of ways a question can be raised.

Accordingly, what is needed are systems and methods that provide more effective and accurate ways to automatically answer questions.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF THE PREFERRED EMBODIMENTS

Figure 1:
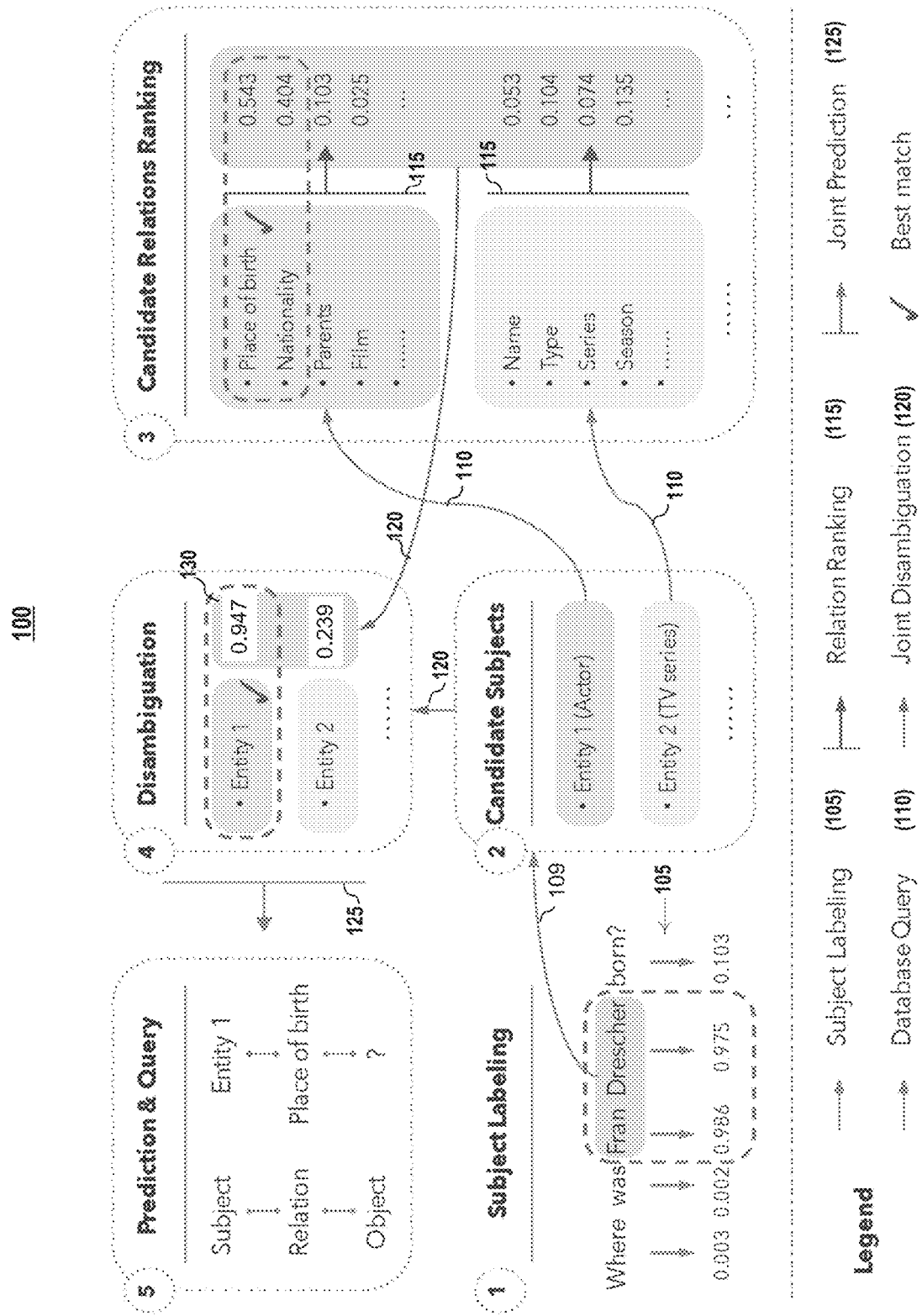
FIG. 1 summarizes an example of the system, according to embodiments of the present disclosure. In embodiments, the system comprises five steps: 1) subject labeling; 2) candidate subject finding; 3) candidate relation ranking; 4) entity disambiguation; and 5) query generation and execution.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Each reference mentioned in this patent document is incorporate by reference herein in its entirety.

One skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Open-domain Question Answering (QA) targets providing exact answer(s) to questions expressed as natural language, without restriction of domain. Recently, the maturity of large-scale Knowledge Graph (KG), such as Freebase, which stores extracted facts from all domains as unified triplets, offers QA systems the opportunity to infer the answer(s) using structured data. Under such circumstances, the core task of a QA system can be formulated as matching the question in natural language with informative triple(s) in KG, and reasoning about the answer(s) based on these triples.

Among all sorts of questions, there is a type of question requiring only one fact (triple) in KG as evidence to answer, which we refer as Simple Questions in this document. A typical example can be "Where was Fran Drescher born?"

Though simple enough, answering such questions remains an unsolved problem. Quite the contrary, Simple Questions are the most common type of question observed in community QA sites.

In this document, inspired by human behaviors in this task, proposes embodiments of a new system for answering Simple Questions. Different from most existing approaches, which generally perform a holistic chunk generation and entity linking, embodiments of systems herein first learn to accurately identify the part of question that describes the entity of interest, just as what a person will first do faced with a new question. Based on the identified language chunk, the system searches the KG for candidate entities with alias of the same surface form. In addition, rather than training a system to disambiguate different entities directly, the relations that each entity has are utilized to decide which one is more possible to appear in the question context. Intuitively, a person disambiguates entities with the same name by recognizing what (relation) is talked about in the question and whether an entity can be mentioned that way (has the relation). Take the process of humans handling the question "Where was Fran Drescher born?" as an example. Although one may have no idea who or what "Fran Drescher" is, it can be known that it is definitely the entity of interest in this question. Then, the database can be searched for the name "Fran Drescher". Assuming there are two entities with this name: one entity is an author, and another one is a TV show. Since one can be quite confident that the question is asking about the place that a person was born, the author entity is chosen and the corresponding property (relation) of it may be checked.

Extensively utilizing continuous Embedding and Stacked Bidirectional Gated-Recurrent-Units-Recurrent-Neural-Network (GRU-RNN) as sub-modules in embodiments of the system, excellent performance is obtained on all sub-modules, which collectively form a powerful yet intuitive neural pipeline for simple question answering.

The rest of this document is organized as follows. After discussing previous work in section B, section C formally defines the problem and introduces embodiment of the system. Then, section D details each sub-module, followed by training techniques in section E. Details of knowledge graphs are presented in section F. Section G provides some conclusions, and section H discloses some example system embodiments.

B. Related Work

The research of knowledge base (KB)-supported QA has evolved from earlier domain-specific QA to open-domain QA based on large-scale KGs. An important line of research has been focused on semantic parsing of questions, which transforms natural language questions into structured queries against KG. Recent progress includes using distant supervision, utilizing paraphrasing, and requiring little question-answer pairs. In contrast, another line of research has proposed to represent both questions and KG elements with continuous embeddings, and then use similarity measures to decide the best match. The main difference among several approaches lies in the model used to embed questions and KG elements. While at least one approach used simpler model (essentially a one-layer structure) to form the question embedding and the knowledge embedding, at least one other approach proposed a deep Convolutional Neural Network (CNN) to do the task. Embodiments of approaches herein fall into this category, but utilize an RNN-based model to construct the question embedding. More importantly, a novel entity linking scheme is used in embodiments. In previous works, entity linking is typically achieved by first generating all possible N-Grams from the question, and then utilizing a ranking model to rank all entities matched any generated N-Gram. In contrast, in embodiments, we first apply sequential labeling to locate the exact subject string, which significantly reduces the number candidate entities, and then take advantage of the implicate constraint between the subject and the relation to rank candidates heuristically.

From the perspective of representation learning, embodiments are also related to compositional neural embedding and continuous knowledge base embedding. The research of compositional neural embedding started from a neural probabilistic language model discussed by Baldi et al., in a technical paper entitled, *"Exploiting the past and the future in protein secondary structure prediction," Bioinformatics*, 15(11): 937-946, 1999, followed by CNN-based models, Recursive Neural Networks based models, and also RNN-based models. For continuous knowledge base embedding, the majority of works focused on the knowledge base completion task, where transformation in the embedding space can be modeled as math operations.

C. Overview

In embodiments, an externally built Knowledge Graph κ is utilized, which organizes knowledge in the form of subject-relation-object triples (s, r, o), where s, o $\in \mathcal{E}$, are entities and r $\in \mathcal{R}$ is a binary relation. Queries in the form of (s, r, ?) against κ will return all objects $o_i \in \mathcal{E}$ such that (s, r, $o_i$) is a valid triple in κ. Therefore, answering a simple question q can be formulated as finding s $\in \mathcal{E}$, r $\in \mathcal{R}$ such that the query (s, r, ?) provides exact answer(s) to the question q. Using the same example "Where was Fran Drescher born?", it can be matched to the query (fran drescher, place of birth, ?). One example Knowledge Graph is Freebase, which is publicly available.

Based on the formulation, the core of embodiments of the present system is a neural pipeline to find the best match for both s and r. In a nutshell, the system comprises two trainable modules (subject labeling and relation ranking), and one rule-based module (joint disambiguation). While the two trainable modules learn to bridge the gap between unstructured language and structured knowledge, the rule-based module makes the final decision based on earlier results. FIG. 1 summarizes an embodiment of the system. As shown in the embodiment depicted in FIG. 1, starting from (1) subject labeling, the system first generates (2) candidate subjects and then (3) rank candidate relations, whose results are then combined to perform joint (4) disambiguation and produce final (5) prediction and answer generation.

In embodiments, the pipeline starts with a trainable subject labeling system, which identifies the chunk c describing the topic subject in the question. Based on the language chunk c, the system issues a query to obtain all entities whose alias has the same surface form as the identified chunk. We term this set of entities z as candidate subjects, denoted by S̃. Essentially, it may be assumed that one of the correct subject's aliases should appear in the question. This assumption is reasonable because modern KGs do include most ways people mention an entity as its aliases (although it shall be noted that more complex approximate matching schemes may be used, which may improve this process). Given the assumption, if the subject labeling is correct, the correct subject must be within the candidate subjects, or formally s $\in$ S̃.

In embodiments, the system will try to identify the correct relation r. Note that the system does not have to retrieve r from all possible relations R, because the obtained candidate subjects have restricted the relation search space to those connected to candidate subjects. Hence, for each candidate subject s̃$\in$S̃, the system queries all relations going out of the subject, denoted as R(s̃$_i$), and aggregates all of them into a list of candidate relations R̃=$\cup_i$R(s̃$_i$). For instance, in a knowledge graph, each candidate subject represents a node and the relations represent edges connected to the candidate subject. Again, it is assured that the correct relation is within candidate relations, or formally r $\in$ R̃. Then, a relation ranking system may be trained to score relations in R̃, where higher score indicates larger possibility to be the correct relation.

Finally, another module applies a simple and heuristic joint disambiguation based on both the candidate subjects and the relation ranking scores, which produces the final prediction of the system.

D. Model Embodiments

1. Subject Labeling

In embodiments, the target of subject labeling is to identify of chunk of words which describe the subject of interest in the natural question. In embodiments, it is formulated as a sequential labeling problem. Essentially, for each token in the question, a binary classification of whether or not this token is part of the subject chunk is made. For completeness, the Stacked Bidirectional GRU-RNN is briefly reviewed, where the Stacked Bidirectional GRU-RNN is the core model of this module.

Firstly, Bidirectional RNNs is a modified recurrent neural networks that presents each input sequence forwards and backwards to two separate recurrent hidden layers, both of which are connected to the same output layer. As a benefit, Bidirectional RNNs are able to capture complete past and future context information for making prediction. Secondly, very similar to Long-Short Term Memory (LSTM), Gated Recurrent Unit (GRU) is special cell design for RNNs. With trainable Gates and Constant Error Carousel (CEC), GRU suffers less from the vanishing gradient problem and is able to learn long-term dependence. Compared to LSTM, GRU is able to achieve similar performance with simpler design and fewer parameters. Finally, as the depth has been shown to be crucial to the success of neural networks theoretically and empirically, adding more layers to RNNs, which take the output of previous layers as input, can improve the performance of RNNs. Among many possible ways of increasing the depth of an RNN, a widely used convention is simply to stack several layers.

In embodiments, all three ideas mentioned above may be combined to form the Stacked Bidirectional GRU-RNN. The structure is somewhat similar to the one discussed by Graves et al., in a technical paper entitled "*Speech recognition with deep recurrent neural networks,*" *Acoustics, Speech and Signal Processing (ICASSP)*," *IEEE International Conference*, pp 6645-6649, IEEE, 2013 and Huang et al., discussed in a technical paper entitled, "*Bidirectional lstm-crf models for sequence tagging,*" *arXiv preprint arXiv*:1508.01991, 2015, except that GRU rather than LSTM is used. In the rest of the document, the Stacked Bidirectional GRU-RNN is abbreviated as S-Bi-GRU.

Figure 2:
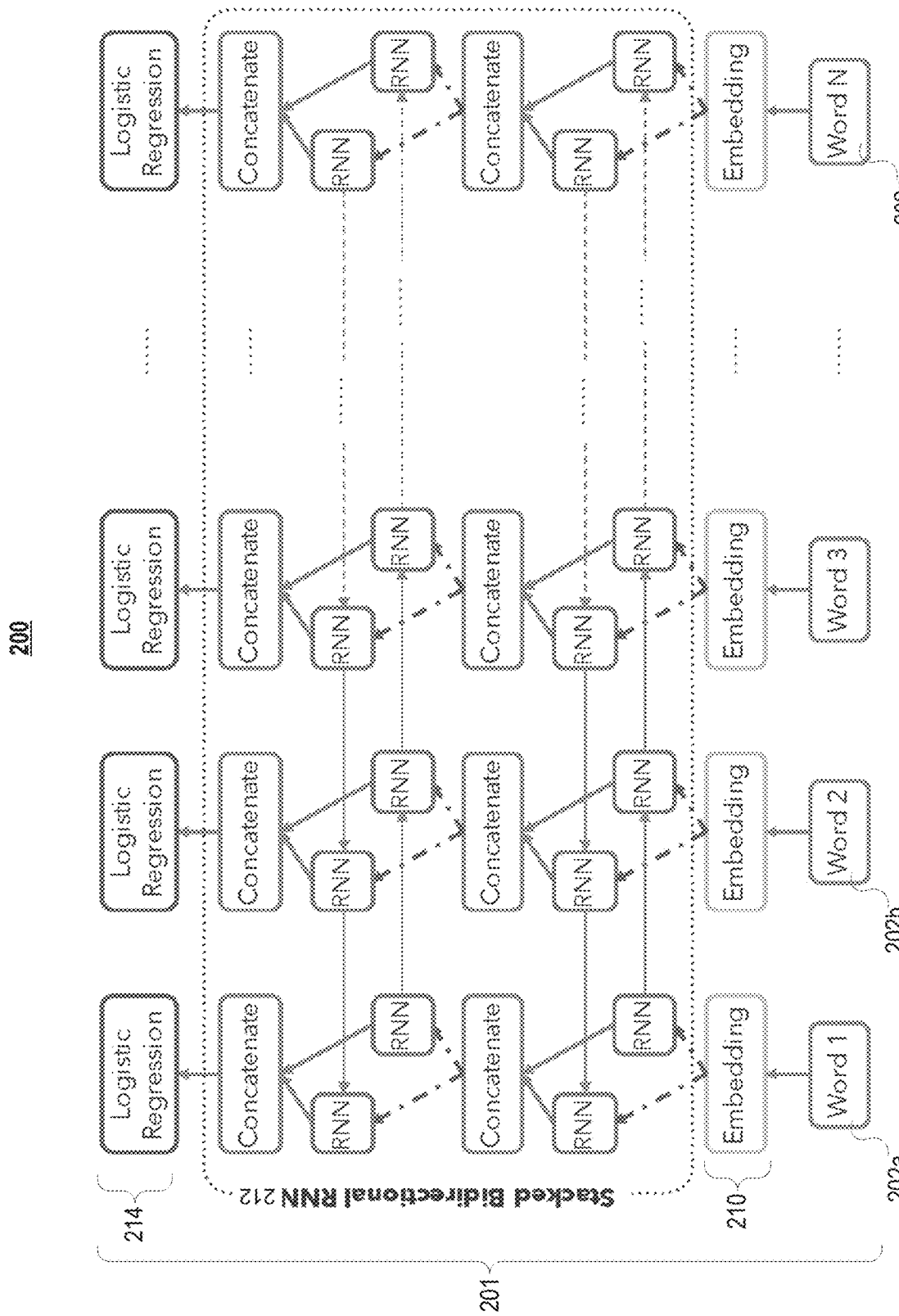
FIG. 2 shows a full model for subject labeling, according to embodiment of the present disclosure, in which a sequential labeling model based on word-embedding and Recurrent Neural Networks (including basic RNN and its variations such as Bi-directional RNN, Bi-directional-Long-Short-Term-Memory (LSTM), and Stacked-Bi-directional-Gated-Recurrent-Units (GRU)) is used to identify the subject string.

FIG. 2 shows the full model for subject labeling 200 (which is the same as the subject modeling 105 in FIG. 1), according to embodiment of the present disclosure, in which a sequential labeling model based on word-embedding and Recurrent Neural Networks (including basic RNN and its variations such as Bi-directional RNN, Bi-directional-LSTM, and Stacked-Bi-directional-GRU) is used to identify the subject string. In embodiments, the model comprises an embedding layer 210 which transforms the discrete input sequence into a sequence of continuous vectors (word embeddings), an S-Bi-GRU 212 which learns to produce the features for classification, and a logistic regression (binary classification) layer 214 to predict the probability of each token being part of the subject chunk based on the features produced by the S-Bi-GRU layer 212. With standard Negative Log Loss (NLL), in embodiments, the model is fully derivable and thus can be trained by Backpropagation directly.

After the model is trained, a question is fed in to get the probability of each token being part of the subject chunk. In embodiments, based on the probability, a threshold is set and all tokens whose probability is higher than the threshold is concatenated as the predicted subject string. In embodiments of the system, a relative measurement rather than the absolute threshold may be used. In embodiments, firstly, the token with the highest probability is selected, and then expand the selection to both sides until the probability decreases more than a certain percentage relative to the adjacent inner one. Empirically, this method is slightly better.

Based on the chosen subject chunk, the candidate subjects may be obtained by querying the KG for entities whose name or alias has the same surface form (i.e., same spelling). However, in embodiments, if no matched entity is founded (5%), the Freebase Suggest API is simply utilized to suggest entities using the chosen chunk. After this, there may be either one or multiple entities as candidate subject(s). For easier reference, the case with only one entity is termed as the single-subject case, and the other case with multiple entities is termed as the multi-subject case.

Figure 3:
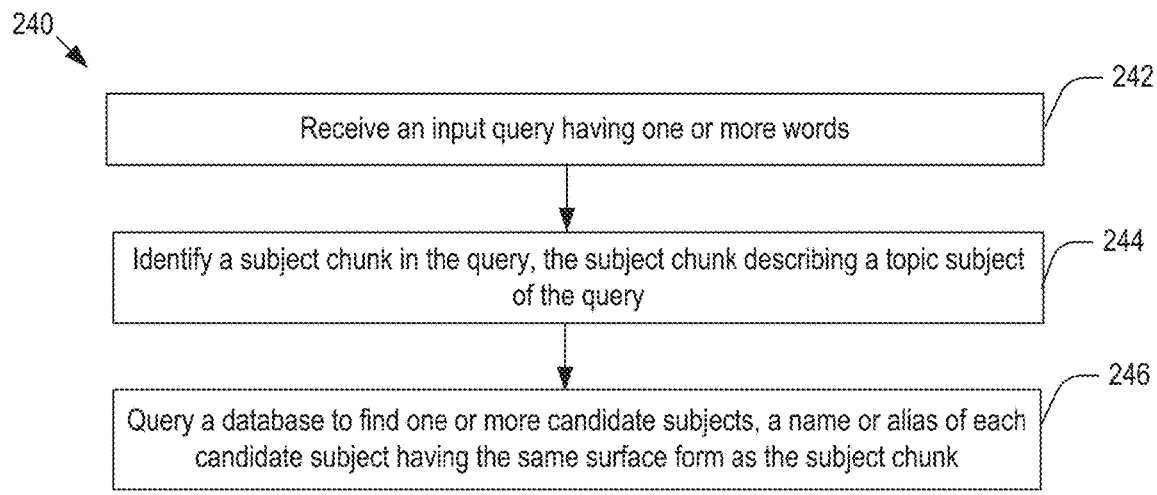
FIG. 3 shows a flowchart of an illustrative process for subject labeling according to embodiments of the present disclosure.

FIG. 3 shows a flowchart 240 of an illustrative process for subject labeling according to embodiments of the present disclosure. At step 242, an input query having one or more words is received. In the present example, the sentence "where was Fran Drescher born?" may be included in the input query. Then, at step 244, the input query may be parsed into five words 202 (where, was, Fran, Drescher and born), and each word may be input to the subject labeling model 201, which includes the embedding layer 210, stacked Bi-directional GRU-RNN 212, and logistic regression layer 214. In embodiments, the subject labeling model 201 identifies a subject chunk. In the present example, as shown in FIG. 1, the subject labeling 200 identifies "Fran Drescher" as a subject chunk. Next, at step 246, the query having the subject chunk is sent to a knowledge base (such as knowledge graph) to get one or more candidate subject entities (or, equivalently, candidate subjects), as indicated by an arrow 109 in FIG. 1. In embodiments, the name or alias of each candidate subject has the same surface form (i.e., spelling) as the subject chunk. In the present example, two entities (actor and TV series) are found as candidate subjects.

Figure 4:
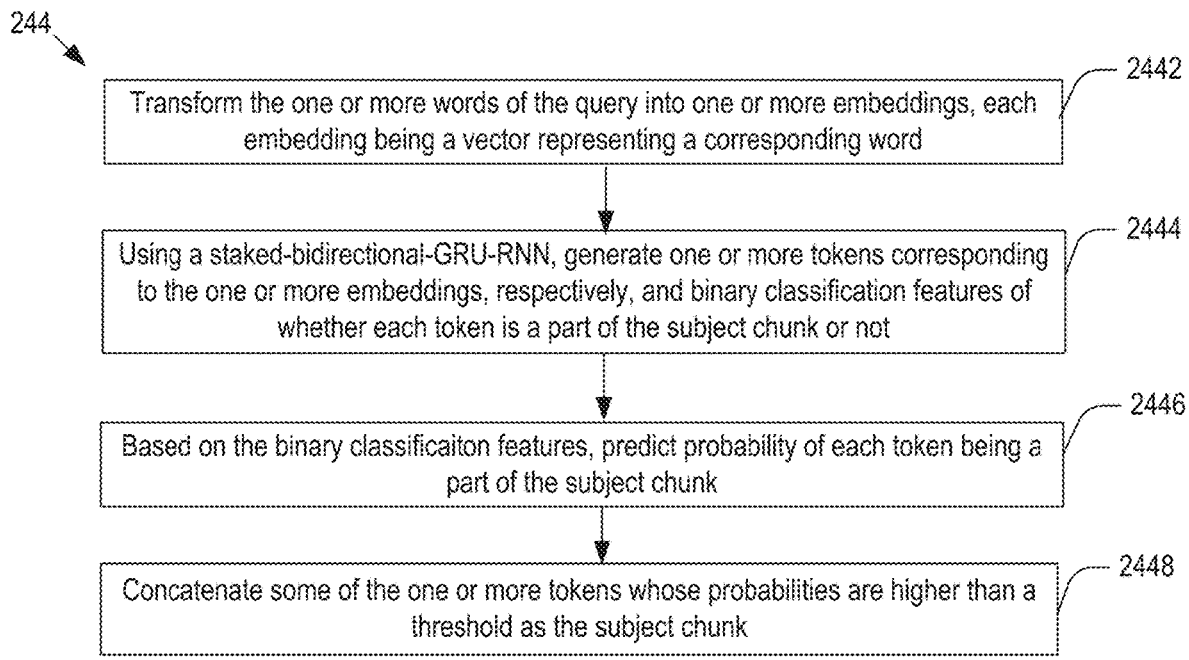
FIG. 4 shows a flowchart of an illustrative process for identifying the subject chunk that describes the subject topic of the input question according to embodiments of the present disclosure.

FIG. 4 shows the detailed process of step 244 according to embodiments of the present disclosure. At step 2442, the embedding layer 210 transforms the one or more words of the input query into one or more embeddings, where each embedding is a vector that represents the corresponding word. Then, at step 2444, the stacked-bidirectional RNN 212, to produce one or more tokens corresponding to the one or more embeddings, respectively, and binary classification features of whether each token is a part of the subject chunk or not. Next, at step 2446, based on the classification features, the logical regression layer 214 predicts the probability of each token being a part of the subject chunk. In the present example, the five words, "where", "was", "Fran", "Drescher" and "born", in the input question have the probabilities of 0.003, 0.002, 0.986, 0.975, and 0.103, respectively. At step 2448, some of the tokens whose probabilities are higher than a threshold may be concatenated as the subject chunk. Hereinafter, the term "some of the tokens" refers to one or more of the tokens. In the present example, the two tokens "Fran" and "Drescher" are concatenated as the subject chunk.

2. Relation Ranking

In embodiments, the relation ranking module aims at identifying the correct relation implied by the question in natural language. In embodiments, as the name of the module suggests, instead of using classification to choose the best relation, this problem is formulated as a ranking problem. Essentially, if a candidate relation is semantically more similar to the question, it should have a higher rank. In embodiments in this disclosure, an embedding approach is taken to measure the semantic similarity between a relation and a question. Firstly, each relation r in the KG is represented as a k-dimensional continuous vector E(r). Then, for each question q, another S-Bi-GRU based model is utilized to embed it into the same k-dimensional vector space as E(q). Since both the relation and the question are represented as vectors of the same dimension, their semantic similarity can be directly computed using some distance metric. Here, we simply exploit the dot product.

Figure 5:
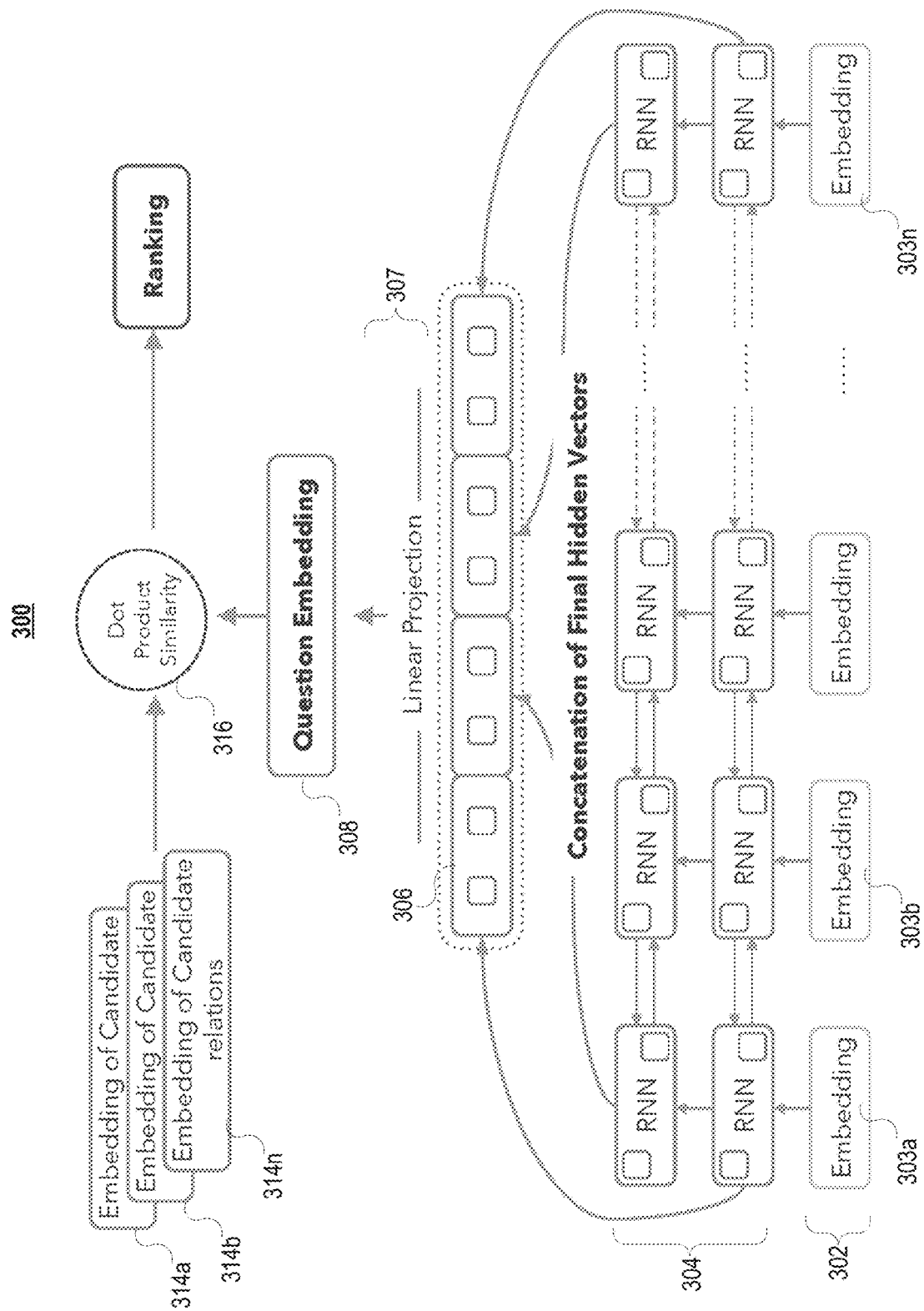
FIG. 5 illustrates an example of a model used to rank a candidate relation from a knowledgebase corresponding to the question, in accordance with embodiments of the present disclosure. An example model using Stacked-Bi-directional-GRU is used to calculate a continuous-valued vector representation for a question (Question-Embedding). Other RNN units such as Bi-directional-RNN and Bi-directional-LSTM may also be used in this step.

FIG. 5 illustrates an example of a model 300 used to rank a candidate relation from a knowledgebase corresponding to the question, in accordance with embodiments of the present disclosure. As depicted, the embedding layer 302 embeds the words in the question to vectors. In the present example, the embedding 303a-303n are vector representations of the five words "where" "was" "Fran" "Drescher" "born," respectively. The final states from all layers of S-Bi-GRU based model 304 are combined to form the question embedding (or, equivalently, question vector) 308. The S-Bi-GRU has been simplified to avoid clutter. As shown in the lower half of the figure, after the S-Bi-GRU based model 304 processes the embedding sequence of the question, final-step hidden output vectors of all stacked layers are concatenated together to form a long vector 306, which is basically a neural representation of the question.

In the case of Bidirectional RNN, final-step indicates both the first step and the last step. However, since the hidden size or the number of layers of the S-Bi-GRU 304 can vary, the dimension of the long vector 306 may not be the same as that of the relation embedding, and thus cannot be directly used as the question embedding. As a solution, in embodiments, another linear projection layer 307 is added to make sure their dimensions match. Hence, the ranking score (semantic similarity score) between a question q and a relation r may be written as $RS(q, r)=E(q)^T E(r)$. In embodiments, each relation r in a KG is represented as a k-dimensional continuous vector E(r) 314. For each question q, the linear projection layer 307 projects the long vector 306 into a k-dimensional question vector E(q) 308 so that question vector E(q) 308 and the relation vector E(r) 314 have the same dimension. In embodiments, a dot product 316 between a relation vector E(r) 314 and the question vector E(q) 308 is performed to get a ranking score.

Finally, in embodiments, to train the ranking model, both positive and negative matches are needed. As positive matches come directly with the dataset, we use negative sampling to obtain the negative matches. Section E.1 of the present document explains the negative sampling method in detail. So, with both positive and negative pairs, some ranking loss can be used to train the S-Bi-GRU based model 304. In embodiments, the margin ranking loss:

$$L(q,r,r')=[\gamma-RS(q,r)+RS(q,r')]$$

is used, where r represents the positive match, r' represents the negative match, and γ is the predefined margin.

Figure 6:
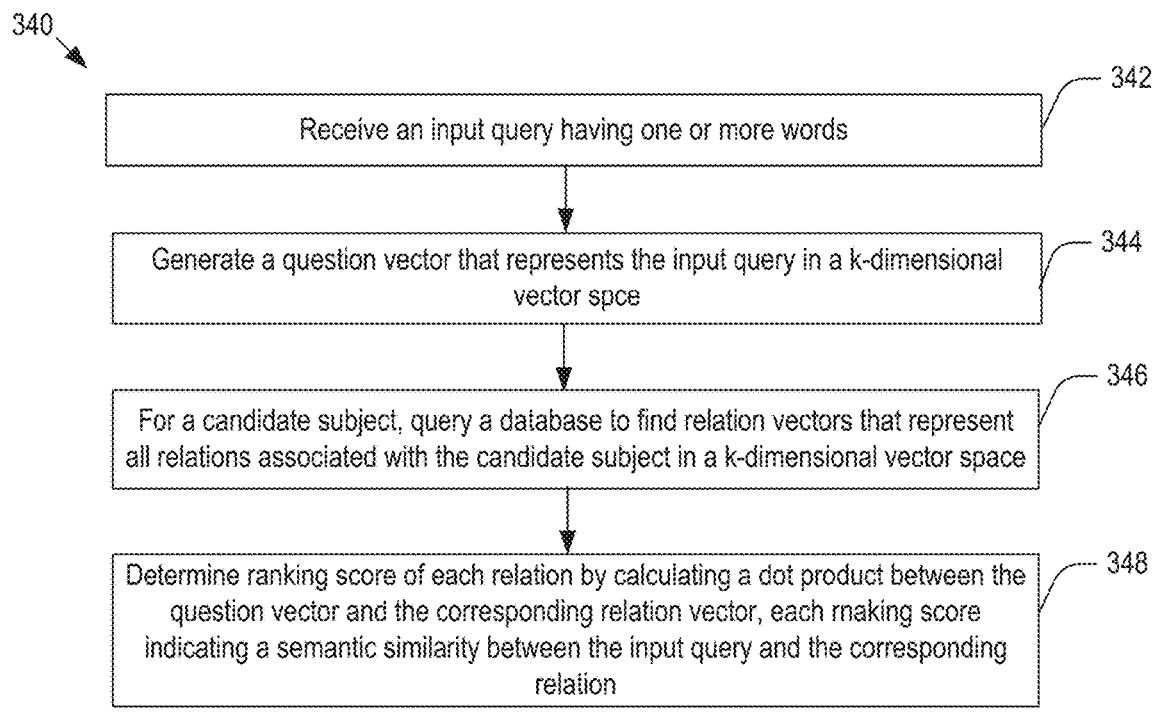
FIG. 6 shows a flowchart of an illustrative process for relation ranking according to embodiments of the present disclosure.

FIG. 6 shows a flowchart 340 of an illustrative process for relation ranking according to embodiments of the present disclosure. At step 342, a query including a question that has one or more words is received. Then, at step 344, the question embedding model 301 may generate a question vector E(q) 308 in a k-dimensional vector space using the input query.

At step 346, a database is queried to get the relation vectors 314 that represent candidate relations in a k-dimensional vector space. In embodiments, for each candidate subject determined in 246, the relation vectors 314 that represent all relations associated with the candidate subject are searched in the database. In the present example, as shown in FIG. 1, the candidate relations for a candidate subject, Entity-1, includes "Place of birth," "Nationality," "Parents", "Film," so on. Likewise, the candidate relations for a candidate subject, Entity-2, includes "Name," "Type," "Series", "season," so on. Then, based on the dot product between the question vector 308 and each of the relation vectors 314, the ranking score 318 of each candidate relation is determined at step 348. In embodiments, each ranking score 318 may be a scalar number and indicate a semantic similarity between the question and the corresponding relation.

Figure 7:
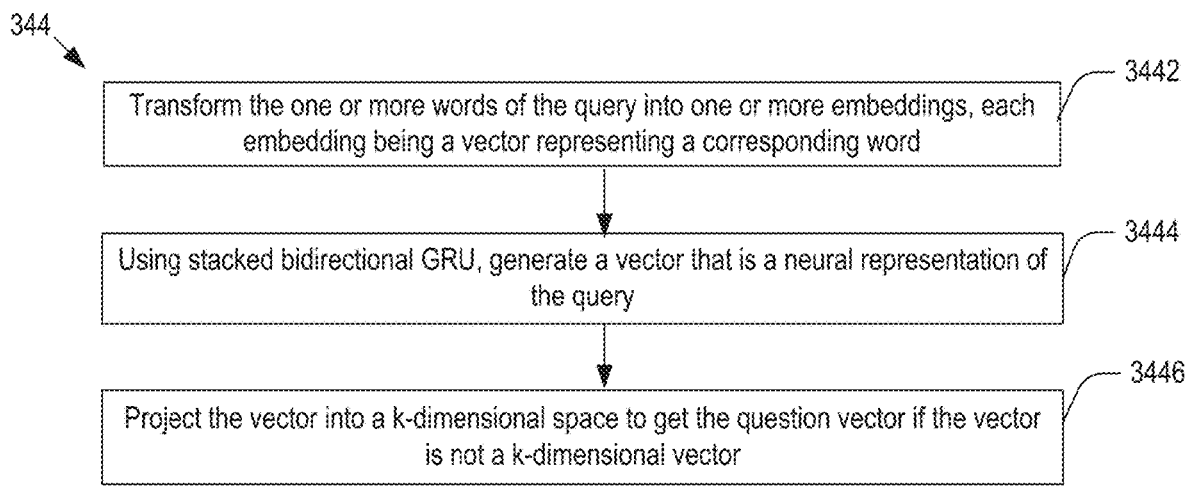
FIG. 7 shows a flowchart of an illustrative process for generating a question vector that represents the input question in a k-dimensional vector space according to embodiments of the present disclosure.

FIG. 7 shows the detailed process of step 344 according to embodiments of the present disclosure. At step 3442, the embedding layer 302 transforms the one or more words of the input question into one or more embeddings 303, where each embedding is a vector representing a corresponding word. At step 3444, the S-Bi-GRU generates a vector 306 that is a neural representation of the query question. Then, at step 3446, the linear projection layer 307 projects the vector 306 into a k-dimensional vector space to get the question vector 308 if the vector 306 is not a k-dimensional vector.

Referring back to FIG. 1, each arrows 110 represents sending a query for a candidate relation to a database at step 346. In the present example, as shown in FIG. 1, the ranking score of the candidate relation "Place of birth" for Entity-1 is 0.543 and the ranking score of the candidate relation "Nationality" for Entity-1 is 0.404. In FIG. 1, relation ranking 115 show the list of relations and their ranking scores for each entity.

3. Joint Disambiguation

In embodiments, after obtaining the ranking score of candidate relations, this module is used to disambiguate candidate subjects (if there are multiple ones), and produce the final prediction of both the subject and the relation.

In embodiments, for the single-subject case, since there is nothing to disambiguate, it is straightforward to choose the only subject as the predicted one, and then the relation with the highest score to be the prediction.

In embodiments, for the multi-subject case, a heuristic based model is used to perform joint disambiguation. The core idea of the joint disambiguation is that if a relation is more semantically similar to the question, it is more probable that the correct subject will have this relation coming out of it. Conceptually, it is the semantics of the relations connected to an entity that defines the semantics of the entity. Based on this idea, the ranking scores of all relations coming out of a subject is used to decide which candidate subject is more correct. For example, the ranking score of a candidate subject $\tilde{s}$ may be defined to be $RS(\tilde{s})=\Sigma_{\tilde{r} \in R(\tilde{s})} RS(\tilde{r})$. However, this may be biased towards candidate subjects with more out connections. Also, relations with low scores may bring in undesired noise. Therefore, in embodiments, only the candidate relations with top-N ranking scores is considered. Here, N is a hyper-parameter to be chosen. Using $R_{top}(\tilde{s})$ to denote the top-N candidate relations, the ranking score of a candidate subject $\tilde{s}$ can be rewritten as $RS(\tilde{s})=\Sigma_{\tilde{r} \in R_{top}(\tilde{s})} RS(\tilde{r})$.

For prediction, in embodiments, the candidate subject with the highest ranking score may be predicted as the correct one, i.e.:

$$\hat{s} = \underset{\tilde{s} \in S}{\arg\max} RS(\tilde{s}) \quad (1)$$

and then predict the correct relation as the one with the highest ranking score among all candidate relations connected to the predicted subject $\hat{s}$, i.e.:

$$\hat{r} = \underset{\tilde{r} \in R(\hat{s})}{\arg\max} RS(\tilde{r}) \quad (2)$$

Note that the order of prediction may be important when $N \geq 3$, because the relation with the highest score among all candidate relations may not be connected to the predicted subject under such circumstances.

Referring to FIG. 1, as indicated by an arrow 120, the joint disambiguation is performed assuming that the hyper-parameter N is 2 for the present example. The ranking scores 130 of the candidate subjects, Entity-1 and Entity-2, are 0.947 and 0.239, respectively. Since Entity-1 has the highest ranking score, Entity-1 is predicted as the correct subject, as indicated by the arrow 125. Also, since the candidate relation "Place of birth" has the highest ranking score, this relation is predicted as the correct relation.

In embodiments, based on the predicted subject and relation, a structured query is generated and sent to a KG server. Then, the KG server executes the structure query to obtain the object, i.e., answer to the question. In embodiments, the KG includes data in the format of N-Triples RDF and each RDF triple has the form (subject, relation, object).

Figure 8:
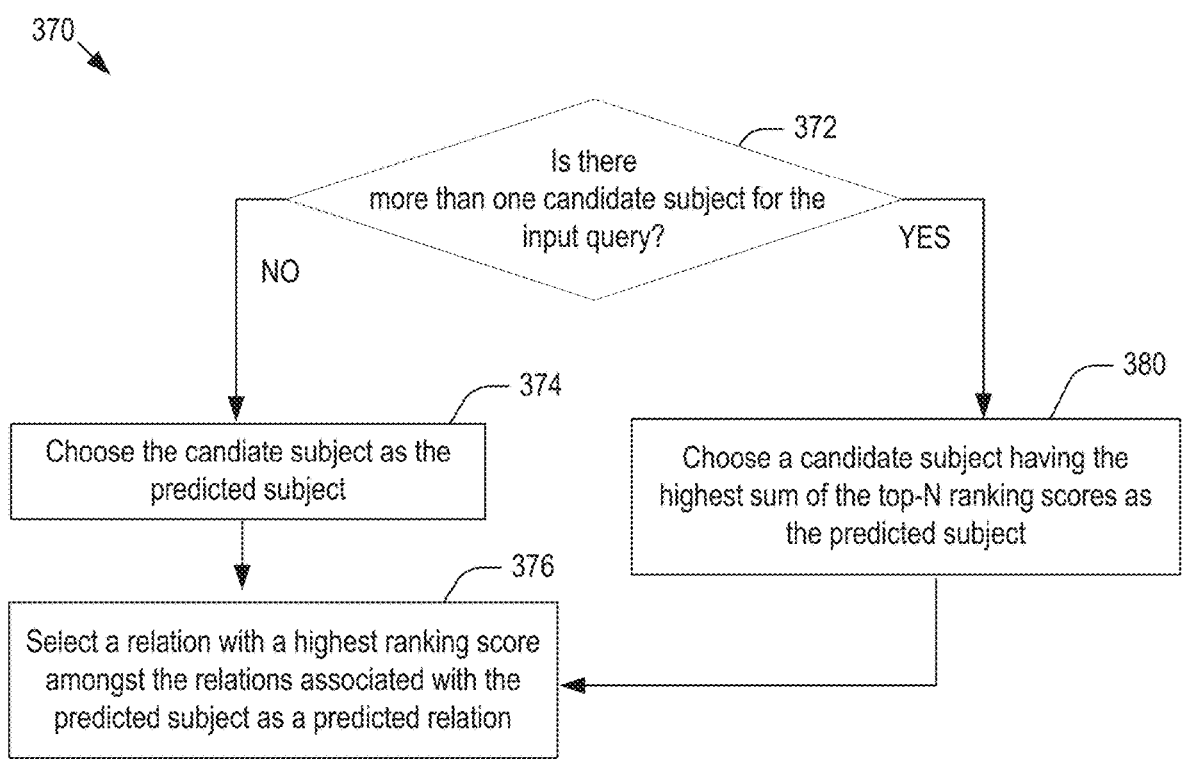
FIG. 8 shows a flowchart of an illustrative process for disambiguating candidate subjects to produce the predicted subject and relation according to embodiments of the present disclosure.

FIG. 8 shows a flowchart 370 of an illustrative process for disambiguating candidate subjects to produce the predicted subject and relation according to embodiments of the present disclosure. At step 372, it is determined whether there is more than one candidate subject for the input query. If there is only candidate subject, the candidate subject is chosen as the predicted subject at step 374. Then, at step 376, a relation with the highest ranking score amongst all relations associated with the predicted subject is selected as the predicted relation.

If there is more than one candidate subject for the input query, the process proceeds to step 380. At step 380, for each candidate subject, the top-N ranking scores are added. Then, the candidate subject having the highest sum of the top-N ranking scores is chosen as the predicted subject. Then, the process proceeds to step 376 to select the predicted relation.

E. Training

As discussed in Section D, in embodiments, the two trainable models are both full derivable and can be trained by standard (mini-batch) Stochastic Gradient Descent (SGD). However, to fully exploit the power of embodiments of the system disclosed herein, extra techniques may be used to speed up the training and improve the convergence. In this section, some training techniques are introduced that, in embodiments, improve the final performance.

1. Mini-Batch Negative Sampling

In embodiments, when training the relation ranking model, for each (q, r, r') triple, the system computes their embeddings E(q), E(r), and E(r') firstly, and then the corresponding dot products $E(q)^T E(r)$, $E(q)^T E(r')$. However, since each question can have only one positive match but thousands of negative matches, if the system simply performs the computation described above for each possible (q, r, r'), it will waste a lot of resources by repetitively computing the same E(q), E(r) and $E(q)^T E(r)$. As a result, if one wants to use many (or even all) negative samples, the training time can be unfeasibly long. As more negative samples generally leads to better performance, in embodiments, it is proposed to use mini-batch negative sampling to relieve the repeated computation problem. Basically, for each positive question relation pair (q, r), instead of sampling one negative relation at a time, a mini-batch of b negative relations $\{r_1', \ldots, r_b'\}$ is sampled. Then, the positive part is computed only once for b negative samples. Further, by efficient memory manipulation, the loop is transformed through different negative samples into a big dense matrix multiplication, which is more GPU-friendly. Moreover, in embodiments, this technique is combined with vectorized computation, where a mini-batch of (q, r, $\{r_1', \ldots, r_b'\}$) triples are computed in parallel. As a result, training the model with exhausted negative sampling is not only feasible but also fast.

2. AdaGrad with Momentum Schedule

As default optimization algorithm for deep neural networks, Stochastic gradient descent (SGD) has been successfully applied to different problems. However, to make good use of it, in embodiments, both the initial learning rate and the annealing schedule may be manually tuned.

In comparison, AdaGrad, which is a SGD variant, has the advantage of self-adjusting (diminishing) the learning rate based on former gradients. Hence, only the global learning rate of AdaGrad needs to be tuned, which is much easier in practice. Moreover, AdaGrad adjusts the learning rate element-wise based on the geometry of the parameter space and thus enables the model to pay special attention to less-frequent (rare) features. So, when substituting SGD with AdaGrad, both the subject labeling model and the relation ranking model can achieve better and more consistent performance stably (e.g., in experiments, performance differences between several runs were within 0.5%) performance stably.

Although AdaGrad is very powerful, it continuously decreases the learning rate based on the magnitude of previous gradients. As a result, the faster the model learns, the faster the learning rate decreases. Hence, the training usually slows down quickly. To overcome this weakness, in embodiments, combining AdaGrad with momentum is proposed, which may enable the AdaGrad to step further in the right direction accumulatively. During each parameter update, the velocity is accumulated using the adjusted gradient $$v_t = \rho_t v_{t-1} - \frac{\eta}{\sqrt{\sum_{i=1}^{t} g_i^2}} g_t \quad (3)$$

where $g_t$, $v_t$, $\rho_t$ are the gradient, accumulated velocity, and momentum rate at time step t, respectively, and all math operations here are element-wise. Then, the accumulated velocity is used to perform the update $$\theta_t = \theta_{t-1} + v_t \quad (4)$$

where $\theta_t$ is the parameter at time step t.

Empirically, for the subject labeling model, combining AdaGrad with momentum gives the same performance using much shorter training time. However, for relation ranking, directly adding momentum caused the loss to oscillate dramatically from the beginning of the training. Consequently, the training loss goes down very slowly, worsening the performance. It is conjectured that this is due to the noisy gradients in the beginning. As a remedy, in embodiments, it is proposed to use momentum schedule, which disables the momentum in the beginning, and starts to increase the momentum gradually after a few epochs or when the training loss reaches a certain level. Intuitively, it is desirable to avoid those noisy gradients in the early stage and use more valid gradients later to form the momentum. In this work, this strategy is referred to as AdaGrad with momentum schedule.

Using AdaGrad with momentum schedule, a much lower training loss is achieved for the relation ranking model using the same training time, leading to 3.0%+ performance improvement on validation set.

3. Dropout

Another technique found to be helpful is to apply vertical dropout to the S-Bi-GRU. In embodiments, dropout is applied to the input signal of each Bi-GRU layer, which is denoted by dot-dash lines before the "RNN" components in FIG. 2. In experiments performed by the inventors, using dropout usually requires longer time for the training to converge to the same level of loss. But once it converges, the model always has better performance on validation set. Therefore, in embodiments, this is incorporated into both the subject labeling model and the relation ranking model.

4. Pretrained Word Embedding

Similar to previous observations, using pretrained word embedding helps to achieve a better performance. In experiments performed by the inventors, when the 300d Glove is used (available at nlp.stanford.edu/projects/glove/), which is an unsupervised learning algorithm for obtaining vector representations for words and developed by Stanford University, Stanford, Calif., to initialize the word embedding, the performance tends to be consistently better than that of randomly initialized embeddings.

5. Tuning Model Structure and Hyperparameters

In embodiments in this work, different settings are used for the sub-structures of the subject labeling model. Below is a guideline to train models on a practical dataset. With other datasets, similar tuning steps with slightly different hyper-parameter setting (e.g. learning rate) may be applied.

For the word embedding layer, since it uses pretrained GloVe as initialization, in embodiments, the parameters are slightly fine-tuned. Thus, in embodiments, instead of using the powerful AdaGrad with momentum, standard SGD is used with a small initial learning rate (0.001) and the learning rate (times 0.85) is annealed after each epoch. For the S-Bi-GRU, two layers with 128 cells are used in each layer. During training, in embodiments, parameters of the S-Bi-GRU and the logistic regression layer are both randomly initialized, and trained by AdaGrad ($\eta$=0.01) with momentum ($\rho t$=0.8). In addition, vertical dropout (0.5) may be applied to the S-Bi-GRU.

In embodiments, for training the relation ranking model, the same setting (i.e., the two models do not share the word embedding in this embodiment) is used for the word embedding layer as in the subject labeling model. For the S-Bi-GRU, in embodiments, a slightly larger structure is used, with two layers of 256 cells. During training, both the S-Bi-GRU and the linear projection layer may be trained by AdaGrad ($\eta$=0.005) with momentum schedule, where the momentum rate is increased by 0.3 until 0.9 after 3 epochs. In addition, in embodiments, weaker dropout (0.3) is applied to the S-Bi-GRU. In embodiments, for the relation embedding, only 128d vectors are used. During training, each relation embedding is constrained to remain within the unit-ball, i.e. $\|E(r)\|<1$. $\forall r \in \mathcal{R}$. Due to the constraint, a smaller learning rate (0.001) may be used to ensure finer search.

F. Knowledge Graph

In embodiments in this work, the latest Freebase dump data is used as the data source of our KG. The data dump contains more than 3B facts, where each fact is prepared in the format of N-Triples RDF. Each RDF triple has the form (subject, relation, object), just as introduced in Section A.

It shall be noted that while this section mention one example data source, namely Freebase, the present disclosure may be used on other knowledge graphs. For example, if the Freebase knowledge graph was replaced with a different language knowledge graph (such as, a Chinese language knowledge graph), and trained with question/answer pairs in that language, the resulting system would be able to answer questions in that language as well.

In embodiments, to store KGs, a graph database (such as Cayley or Virtuoso, both are open source software) is utilized, which can directly load N-Triples RDF data into its storage. In addition, Cayley can be easily queried in a Gremlin-inspired manner. Virtuoso can be easily queried in SPARQL (which is a query language for graph database specified in www.w3.org/TR/rdf-sparq1-query/ and made a standard by World Wide Web Consortium). Any other graph database with the same capability may be used as a replacement.

G. Some Conclusions

Presented herein are embodiments of systems and methods of novel and nonobvious frameworks for simple question answering. With the unique subject labeling module, most noisy information found in previous systems is excluded and the entity linking problem is reduced to a disambiguation problem. With proper training techniques, a powerful S-Bi-GRU based ranking model may be obtained to match natural language with structured relation. Moreover, in embodiments, utilizing the underlying regularity between subject and relation, a heuristic disambiguation method achieves very competitive performance. Putting sub-modules together, embodiments of the neural pipeline outperforms previous systems on the SIMPLEQUESTIONS dataset.

H. System Embodiments

Figure 9:
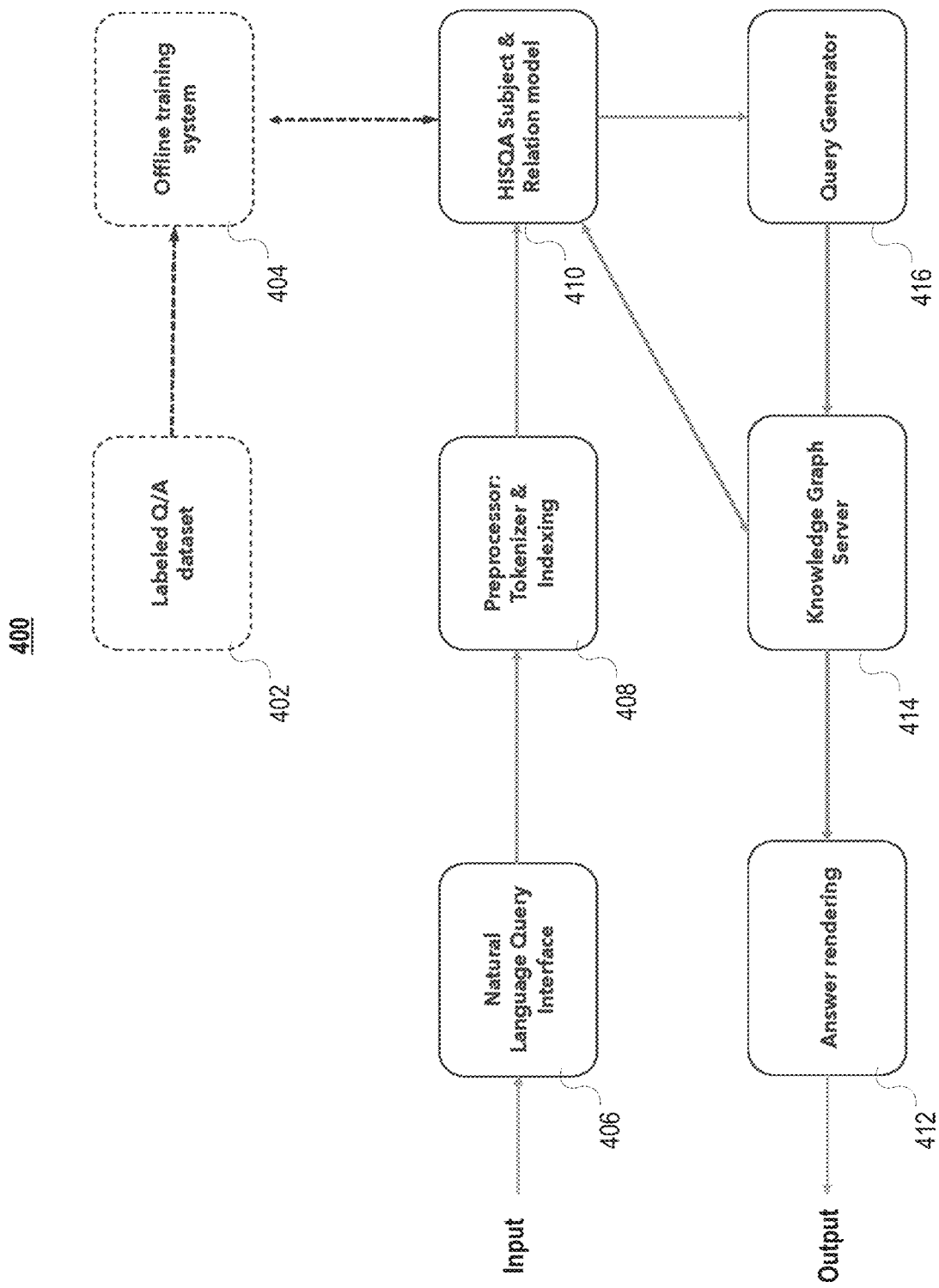
FIG. 9 depicts an example system diagram according to embodiments of the present disclosure.

FIG. 9 depicts an example system diagram according to embodiments of the present disclosure. As shown in the embodiment depicted in FIG. 9, the system 400 may comprise: a natural language query interface 406 to receive an input query; a preprocessor stage 408 that performs tokenization and indexing of the input query, that is, translating queries such as "Where was Fran Drescher born?" into sequences of numbers where each word is mapped to an integer value according to a pre-built dictionary (the dictionary is a mapping from words or tokens into integer indices); a HISQA subject & relation model 410 according to embodiments disclosed herein (Section D); a query generator 416 that generates a structured query using a graph traversal language, such as Gremlin, according to the subject and relation found by the model in previous step; a knowledge graph server 414 interfaces with the query generator 416 and the model 410 to execute the structured query to obtain an answer (as Section F); and an answer rendering module 412 that outputs and presents the results in text or html page. In embodiments, the system 400 may also comprise a training system (which may be done offline), which may access a labeled Q/A dataset 402 to train an HISQA model 410, as discussed above (Section E). An example structured query for the example question produced by the query generator can be "SELECT ?object WHERE {<entity_for_fran_drescher> <place_of_birth_for_person> ?object}".

Figure 10:
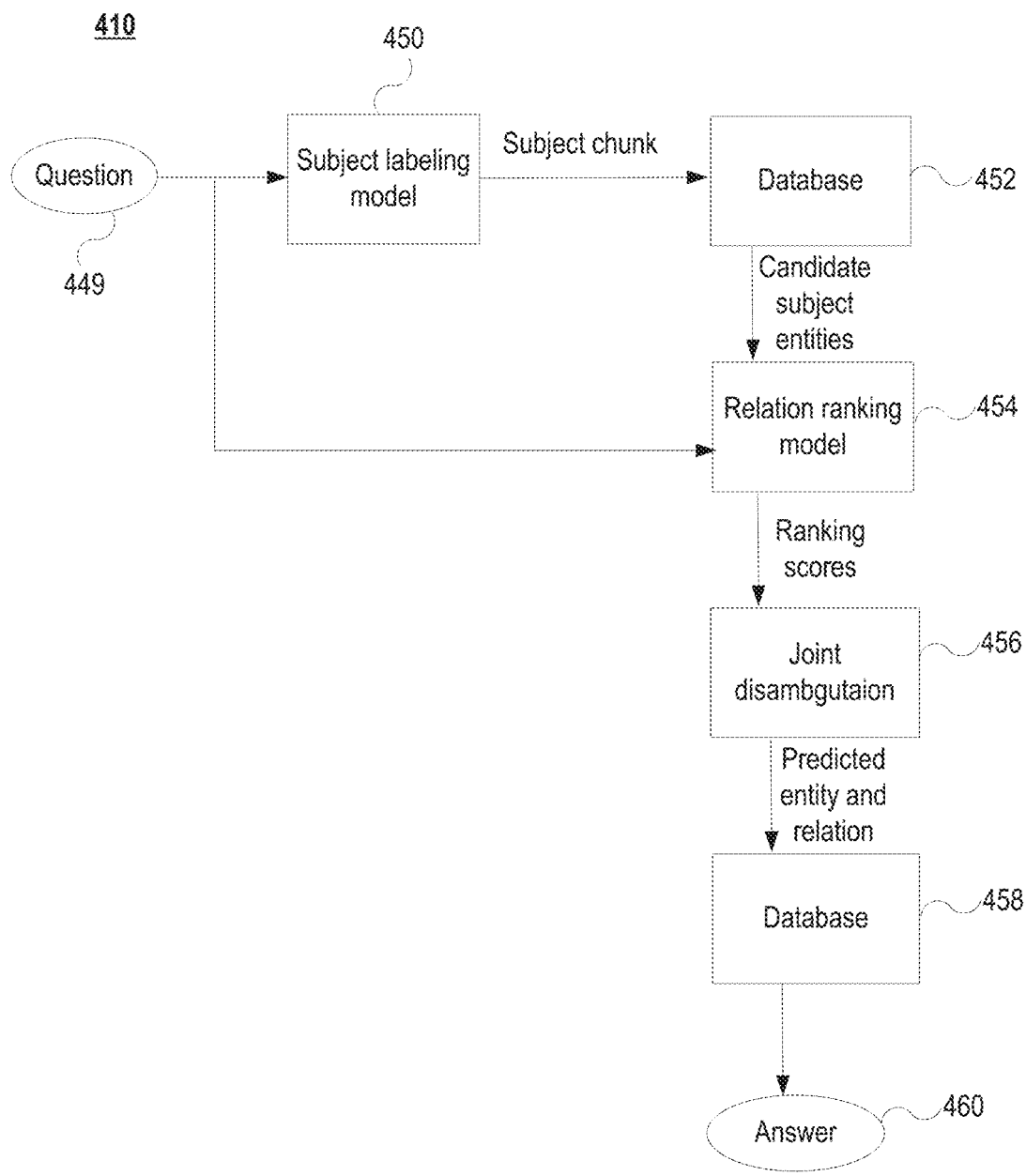
FIG. 10 depicts an example diagram of the human inspired simple question answering (HISQA) subject & relation model according to embodiments of the present disclosure.

FIG. 10 depicts an example diagram of the human inspired simple question answering (HISQA) Subject & Relation model 410 according to embodiments of the present disclosure. As depicted, an input question 449 is sent to the subject labeling model 450, where the subject labeling model 450 identifies a subject chunk that describes the topic subject of the input question. In embodiments, the question 449 may be tokenized and indexed, that is, the question, such as "Where was Fran Drescher born?" may be transformed into sequences of numbers where each word is mapped to an integer value according to a pre-built dictionary. Using the subject chunk, a database 452 is queried to find one or more candidate subject entities whose names or aliased have the same surface form as the subject chunk.

The relation ranking model 454 generates a question vector using the question 449. It also finds one or more relation vectors that represent one or more relations associated with the candidate subject entities and determines ranking scores of the one or more relations by performing dot products between a question vector and the one or more relation vectors.

The joint disambiguation 456, which may be a computer software, hardware or a firmware, selects the predicted subject entity and relation among the candidate subject entities and the one or more relations. Using the predicted subject entity and relation, a database 458 is queried to find the answer 460 to the question 449.

Figure 11:
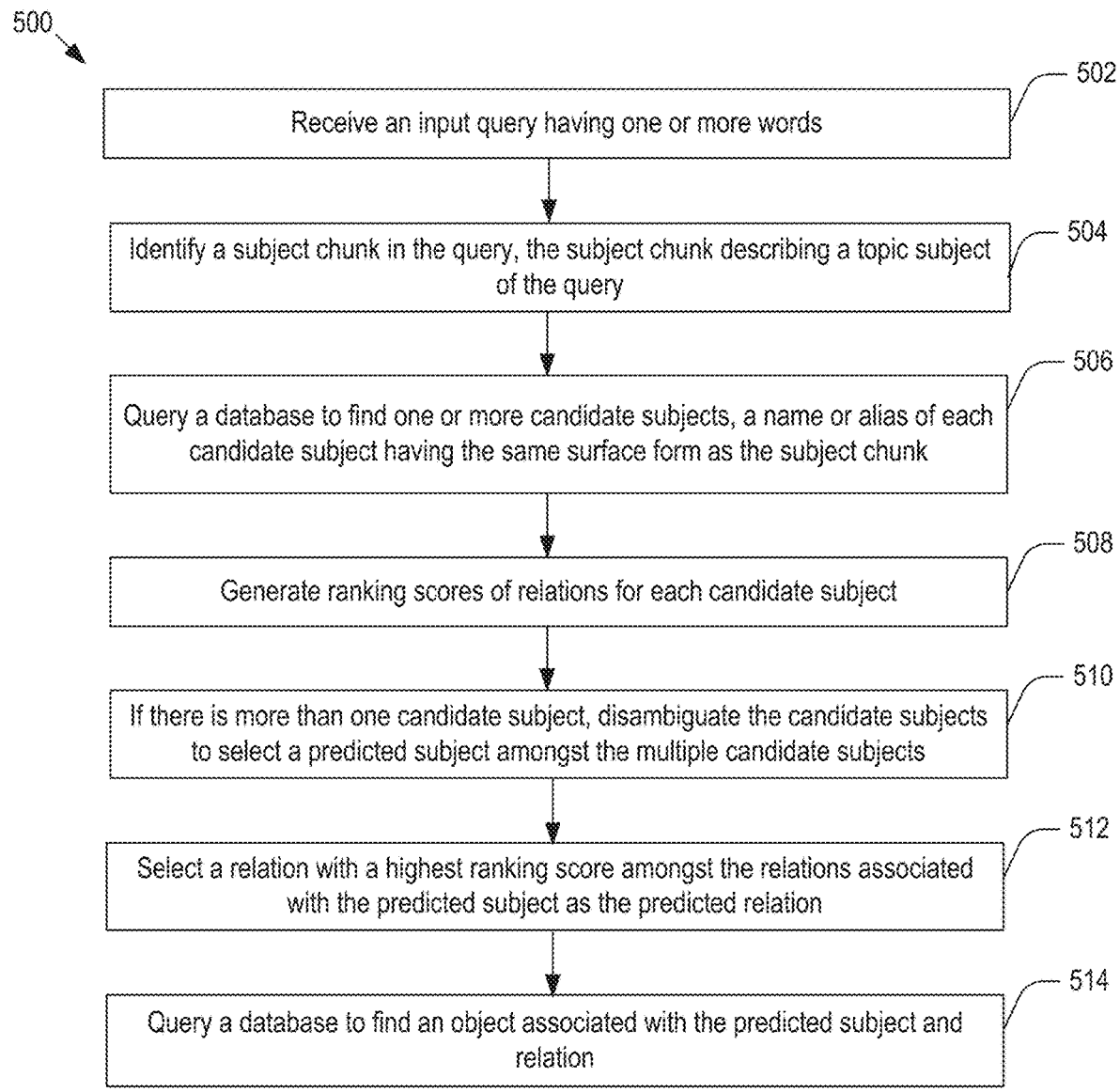
FIG. 11 shows a flowchart of an illustrative process for providing answer to an input query according to embodiments of the present disclosure.

FIG. 11 shows a flowchart 500 of an illustrative process for providing answer (or, equivalently, object) to an input query according to embodiments of the present disclosure. At step 502, an input query is received, where the input query may include a human inspired question. Then, at step 504, the subject labeling model 204 to identify the subject chunk of the query. Next, at step 506, using the subject chunk, a database is queried to find one or more candidate subjects.

At step 508, the ranking scores of the relations are generated for each candidate subject. In embodiments, the question embedding model 301 generates the question embedding 308 that may be a k-dimensional vector. For each of the candidate subject, the relation vectors 314 that correspond to all of the relations associated with the candidate subject are searched from a database. Then, for each of the candidate subject, the dot product between the relation vectors 314 associated with the candidate subject and the question embedding 308 is performed to determine the ranking scores of the relation vectors. In embodiment, for each candidate subject, the relation having the highest ranking score is identified as the correct relation for the candidate subject.

At step 510, if there are more than one candidate subjects, disambiguation of the candidate subjects is performed to select one of the candidate subject as the finally predicted subject. In embodiments, for each candidate subject, the top-N ranking scores are added. Then, the candidate subject having the highest sum of the top-N ranking scores is selected as the predicted subject. At step 512, the relation having the highest ranking score is selected amongst the relations associated with the predicted subject as the finally predicted relation.

At step 514, a database is queried to find the object associated with the predicted subject and predicted relation. In embodiments, the data in the database is organized in the form of subject-relation-object triples.

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 12:
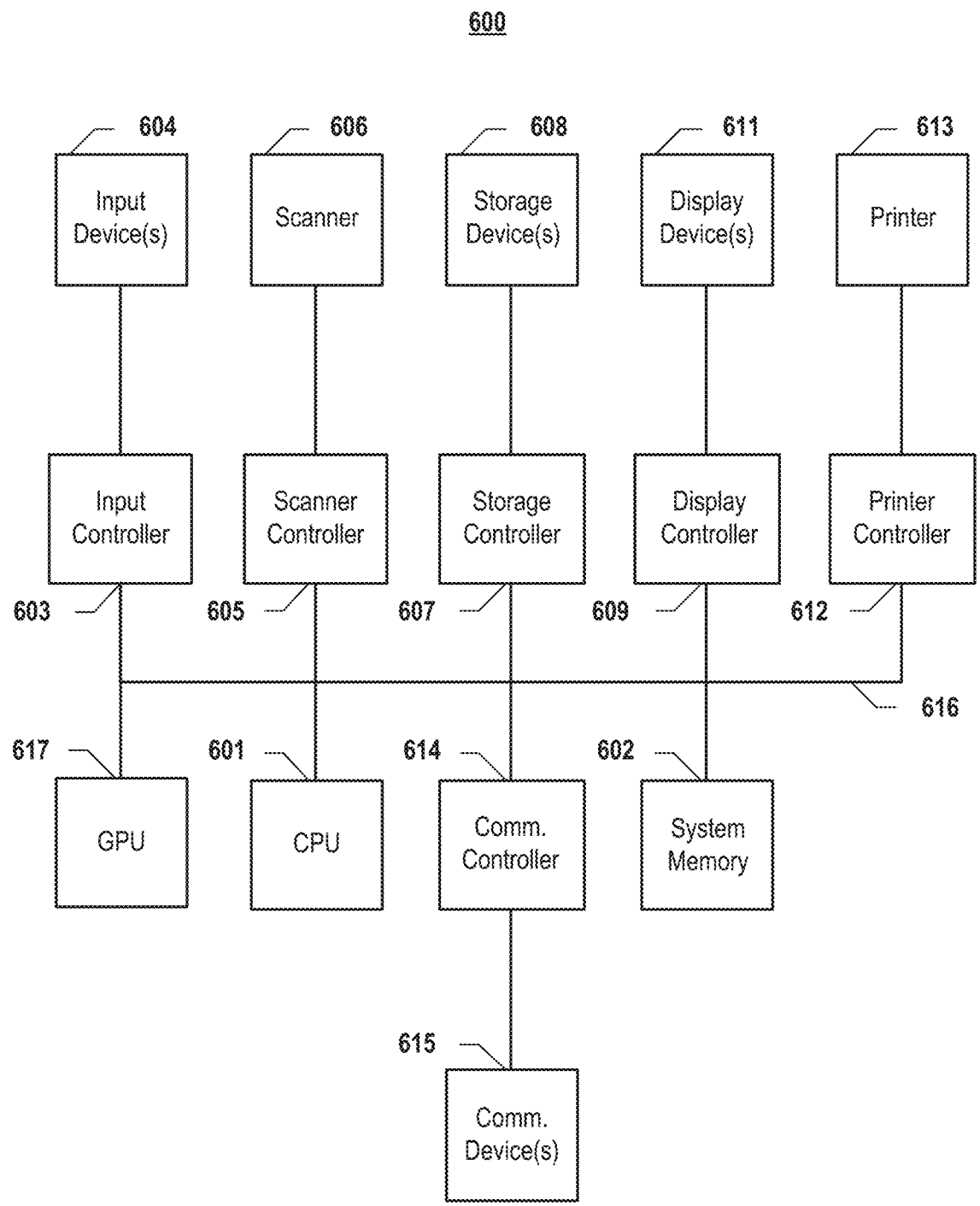
FIG. 12 depicts a simplified block diagram of a computing device/information handling system, in accordance with embodiments of the present disclosure.

FIG. 12 depicts a simplified block diagram of a computing device/information handling system (or computing system) according to embodiments of the present disclosure. It will be understood that the functionalities shown for system 600 may operate to support various embodiments of an information handling system—although it shall be understood that an information handling system may be differently configured and include different components.

As illustrated in FIG. 12, system 600 includes one or more central processing units (CPU) 601 that provides computing resources and controls the computer. CPU 601 may be implemented with a microprocessor or the like, and may also include one or more graphics processing units (GPU) 617 and/or a floating point coprocessor for mathematical computations. System 600 may also include a system memory 602, which may be in the form of random-access memory (RAM), read-only memory (ROM), or both.

A number of controllers and peripheral devices may also be provided, as shown in FIG. 12. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. System 600 may also include a display controller 609 for providing an interface to a display device 611, which may be a cathode ray tube (CRT), a thin film transistor (TFT) display, or other type of display. The computing system 600 may also include a printer controller 612 for communicating with a printer 613. A communications controller 614 may interface with one or more communication devices 615, which enables system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims, below, may be arranged differently including having multiple dependencies, configurations, and combinations. For example, in embodiments, the subject matter of various claims may be combined with other claims.

What is claimed is:

1. A computer-implemented method for providing an answer to a query, the method comprising:
   receiving a query having one or more words, the one or more words including a subject chunk that describes a subject of the query;
   identifying the subject chunk using a trained subject labeling neural network by performing the steps comprising:
      transforming the one or more words of the query into one or more embeddings, each of the embeddings being a vector representing a corresponding word;
      using a set of neural network layers to convert the one or more embeddings into features;
      predicting, using the features produced by the set of neural network layers, a probability of each of the one or more words being a part of the subject chunk; and
      selecting one or more words whose associated probabilities are higher than a threshold as the subject chunk;
   querying a database to find at least one candidate subject, a name or an alias of the at least one candidate subject having a same surface form as the subject chunk;
   querying a knowledge graph database to find one or more relations that represent one or more relations associated with the at least one candidate subject;
   determining ranking scores of the one or more relations using a trained relation ranking neural network, each of the ranking scores indicating a semantic similarity between the query and a corresponding relation;
   responsive to the at least one candidate subject comprising a single candidate subject, selecting a relation with a highest ranking score amongst the one or more relations as a predicted relation and selecting the at least one candidate subject as a predicted subject;
   responsive to the at least one candidate subject comprising a plurality of candidate subjects:
      using one or more of the ranking scores to disambiguate the plurality of candidate subjects to select a predicted subject amongst the plurality of candidate subjects; and
      selecting as a predicted relation a relation with a highest ranking score amongst the one or more relations associated with the candidate subject that was selected as the predicted subject; and
   querying the knowledge graph database with the predicted relation and predicted subject to find an answer to the query.

2. A computer-implemented method as recited in claim 1, wherein the database is the knowledge graph.

3. A computer-implemented method as recited in claim 1, wherein the steps of using a set of neural network layers to convert the one or more embeddings into features and predicting a probability of each of the one or more words being a part of the subject chunk comprises:
   generating, using the set of neural network layers, binary classification features of whether each word is a part of the subject chunk; and
   using a binary classification layer and the binary classification features, predicting a probability for each word related to whether it is a part of the subject chunk.

4. A computer-implemented method as recited in claim 1, wherein the step of determining ranking scores of the one or more relations using a trained relation ranking neural network, each of the ranking scores indicating a semantic similarity between the query and a corresponding relation comprises:
   transforming the one or more words of the query into one or more embeddings, each embedding being a vector representing a corresponding word;
   using the one or more embeddings and a set of recurrent neural layers, generating a question vector that is a neural representation of the query;
   representing each of the one or more relations as a relation vector; and
   for each relation, using a comparison between the question vector and its corresponding relation vector to determine its ranking score.

5. A computer-implemented method as recited in claim 4, further comprising:
   if a dimension of the question vector is not equal to a dimension of each of the relation vectors, projecting the question vector into a vector having a same dimension as the relation vectors.

6. A computer-implemented method as recited in claim 4, wherein the step of, for each relation, using a comparison between the question vector and its corresponding relation vector to determine its ranking score comprises:
   performing dot product using the question vector and the relation vector.

7. A computer-implemented method as recited in claim 1, wherein the step of using at least some of the ranking scores to disambiguate the plurality of candidate subjects to select a predicted subject amongst the plurality of candidate subjects comprises:
   selecting as a predicted subject a candidate subject from the plurality of candidate subjects that has a highest ranking score combination formed from a combination of a set of top ranking scores of relations associated with the candidate subject.

8. A computer-implemented method as recited in claim 7, wherein the step of selecting as a predicted subject a candidate subject from the plurality of candidate subjects that has a highest ranking score combination formed from a combination of a set of top ranking scores of relations associated with the candidate subject comprises:
   for each candidate subject from the plurality of candidate subjects, adding top-N of the ranking scores associated with the candidate subject, N being an integer number; and
   selecting a candidate subject having a highest sum of the top-N ranking scores as the predicted subject.

9. A computer-implemented method for identifying a subject in a question, the method comprising:
   receiving a query question having one or more words, the one or more words including a subject of the query question;

transforming the one or more words into one or more embeddings, each embedding being a vector representing a corresponding word;

using a set of bidirectional neural network layers to convert the one or more embeddings into features;

predicting, using the features produced by the set of bidirectional neural network layers and a classification layer, a probability of each of the one or more words being a part of the subject; and selecting one or more words whose probabilities are higher than a threshold as the subject.

10. A computer-implemented method as recited in claim 9, wherein the steps of using a set of bidirectional neural network layers to convert the one or more embeddings into features and predicting a probability of each of the one or more words being a part of the subject comprise:

generating, using the set of bidirectional neural network layers, binary classification features of whether each word is a part of the subject; and using a logistic regression layer as the classification layer and the binary classification features, predicting a probability for each word related to whether it is a part of the subject.

11. A computer-implemented method as recited in claim 9, wherein the set of bidirectional neural network layers comprises one or more layers of: Bi-directional RNN, Bi-directional Long-Short-Term-Memory (LSTM) and stacked-Bi-directional-Gated-Recurrent-Units (GRU)-RNN.

12. A computer-implemented method as recited in claim 9, wherein the threshold is relative and the step of selecting one or more words whose probabilities are higher than a threshold as the subject comprises:

selecting a word associated with a highest probability as part of the subject; and including as part of the subject each word on either side of the selected word whose associated probability has not decreased by more than a threshold percentage relative to its adjacent inner word's associated probability.

13. A non-transitory computer-readable medium or media comprising one or more sequences of instructions which, when executed by at least one of the one or more processors, causes steps to be performed comprising:

receiving a query having one or more words, the one or more words including a subject chunk that describes a subject of the query;

identifying the subject chunk using a trained subject labeling neural network by performing the steps comprising:

transforming the one or more words of the query into one or more embeddings, each of the embeddings being a vector representing a corresponding word;

using a set of neural network layers to convert the one or more embeddings into features;

predicting, using the features produced by the set of neural network layers, a probability of each of the one or more words being a part of the subject chunk; and selecting one or more words whose associated probabilities are higher than a threshold as the subject chunk;

querying a database to obtain at least one candidate subject;

querying a database to find one or more relations that represent one or more relations associated with the at least one candidate subject;

determining ranking scores of the one or more relations using a trained relation ranking neural network, each of the ranking scores indicating a semantic similarity between the query and a corresponding relation;

responsive to the at least one candidate subject comprising a single candidate subject, selecting a relation with a highest ranking score amongst the one or more relations as a predicted relation and selecting the at least one candidate subject as a predicted subject;

responsive to the at least one candidate subject comprising a plurality of candidate subjects:

using one or more of the ranking scores to disambiguate the plurality of candidate subjects to select a predicted subject amongst the plurality of candidate subjects; and selecting as a predicted relation a relation with a highest ranking score amongst the one or more relations associated with the candidate subject that was selected as the predicted subject; and querying a database with the predicted relation and predicted subject to find an answer to the query.

14. The non-transitory computer-readable medium or media of claim 13, wherein the set of neural network layers are a set of bidirectional neural network layers.

15. The non-transitory computer-readable medium or media of claim 13, wherein the step of predicting, using the features produced by the set of neural network layers, a probability of each of the one or more words being a part of the subject chunk comprises:

generating binary classification features of whether each word is a part of the subject chunk; and using a binary classification layer and the binary classification features, predicting a probability for each word related to whether it is a part of the subject chunk.

16. The non-transitory computer-readable medium or media of claim 13, wherein the step of selecting one or more words whose associated probabilities are higher than a threshold as the predicted subject comprises:

selecting a word associated with a highest probability as part of the predicted subject; and including as part of the predicted subject each word on either side of the selected word whose associated probability has not decreased by more than a threshold percentage relative to its adjacent inner word's associated probability.

17. The non-transitory computer-readable medium or media of claim 13, wherein the step of determining ranking scores of the one or more relations using a trained relation ranking neural network, each of the ranking scores indicating a semantic similarity between the query and a corresponding relation comprises:

transforming the one or more words of the query into one or more embeddings, each embedding being a vector representing a corresponding word;

using the one or more embeddings and a set of recurrent neural layers, generating a question vector that is a neural representation of the query;

representing each of the one or more relations as a relation vector; and for each relation, using a comparison between the question vector and its corresponding relation vector to determine its ranking score.

18. The non-transitory computer-readable medium or media of claim 16, further comprises one or more sequences of instructions which, when executed by at least one of the one or more processors, causes steps to be performed comprising:

if a dimension of the question vector is not equal to a dimension of each of the relation vectors, projecting the question vector into a vector having a same dimension as the relation vectors.

19. The non-transitory computer-readable medium or media of claim 16, wherein the step of for each relation, using a comparison between the question vector and its corresponding relation vector to determine its ranking score comprises:

performing dot product using the question vector and the relation vector.

20. The non-transitory computer-readable medium or media of claim 13, wherein the step of using at least some of the ranking scores to disambiguate the plurality of candidate subjects to select a predicted subject amongst the plurality of candidate subjects comprises:

selecting as a predicted subject a candidate subject from the plurality of candidate subjects that has a highest ranking score combination formed from a combination of a set of top ranking scores of relations associated with the candidate subject.

* * * * *